(12) United States Patent
Suzuki et al.

(10) Patent No.: US 7,712,605 B2
(45) Date of Patent: May 11, 2010

(54) GAS STORAGE CONTAINER WITH GAS ABSORBING OR ADSORBING MATERIAL

(75) Inventors: Takanori Suzuki, Utsunomiya (JP); Yusuke Sogawa, Utsunomiya (JP); Terumi Furuta, Tokorozawa (JP)

(73) Assignee: Honda Motor Co., Ltd., Tokyo (JP)

( * ) Notice: Subject to any disclaimer, the term of this patent is extended or adjusted under 35 U.S.C. 154(b) by 132 days.

(21) Appl. No.: 12/002,637

(22) Filed: Dec. 18, 2007

(65) Prior Publication Data

US 2008/0142377 A1 Jun. 19, 2008

(30) Foreign Application Priority Data

Dec. 19, 2006 (JP) ............... 2006-341012

(51) Int. Cl.
*B65B 3/00* (2006.01)
*F26B 5/04* (2006.01)
*F17C 11/00* (2006.01)
*B01D 53/04* (2006.01)
*F28D 15/00* (2006.01)

(52) U.S. Cl. ............... 206/0.7; 34/416; 62/46.1; 96/108; 165/104.12; 165/157

(58) Field of Classification Search ............... 206/0.7; 34/416; 62/46.1–46.3, 48.1; 95/116, 121, 95/139, 141; 96/108; 165/104.12, 157, 158
See application file for complete search history.

(56) References Cited

U.S. PATENT DOCUMENTS

| | | | | |
|---|---|---|---|---|
| 4,134,491 A | * | 1/1979 | Turillon et al. ............... | 206/0.7 |
| 4,196,525 A | * | 4/1980 | Ebdon et al. ............... | 34/416 |
| 4,583,638 A | * | 4/1986 | Bernauer et al. ............... | 206/0.7 |
| 4,819,717 A | * | 4/1989 | Ishikawa et al. ............... | 165/104.12 |
| 4,819,718 A | * | 4/1989 | Ishikawa et al. ............... | 165/104.12 |
| 5,298,231 A | * | 3/1994 | Rockenfeller ............... | 95/116 |
| 6,503,584 B1 | * | 1/2003 | McAlister ............... | 62/46.1 |
| 7,112,239 B2 | * | 9/2006 | Kimbara et al. ............... | 96/108 |
| 7,152,665 B2 | * | 12/2006 | Toh et al. ............... | 165/158 |
| 7,169,214 B2 | * | 1/2007 | Kubo et al. ............... | 96/108 |
| 7,318,520 B2 | * | 1/2008 | Golben ............... | 206/0.7 |
| 7,418,782 B2 | * | 9/2008 | Kimbara et al. ............... | 206/0.7 |
| 2005/0145378 A1 | | 7/2005 | Mori et al. | |
| 2008/0028933 A1 | * | 2/2008 | Ross et al. ............... | 96/108 |

FOREIGN PATENT DOCUMENTS

| | | |
|---|---|---|
| JP | 2001-145832 | 5/2001 |
| JP | 2004-108570 | 4/2004 |

* cited by examiner

*Primary Examiner*—Bryon P Gehman
(74) *Attorney, Agent, or Firm*—Lahive & Cockfield, LLP; Anthony A. Laurentano, Esq.

(57) ABSTRACT

An elongate gas distributing tube, which extends in a longitudinal direction of a container, is accommodated within the container that constitutes a gas storage container. Discharge ports, through which the gas is discharged, are provided only on a side circumferential wall of the gas distributing tube. Therefore, the discharged gas advances while being directed toward the inner side wall of the container. The gas distributing tube is surrounded by a gas absorbing/adsorbing material. On the other hand, the gas absorbing/adsorbing material is surrounded by a mixture, which is prepared by mixing the gas absorbing/adsorbing material with a heat storage material, such that heat is absorbed by the heat storage material contained therein.

14 Claims, 6 Drawing Sheets

GAS STORAGE CONTAINER WITH GAS ABSORBING OR ADSORBING MATERIAL

BACKGROUND OF THE INVENTION

1. Field of the Invention

The present invention relates to a gas storage container. In particular, the present invention relates to a gas storage container, which accommodates a gas absorbing/adsorbing material therein.

2. Description of the Related Art

As is well known, a fuel cell generates electric power by supplying a fuel gas such as hydrogen to an anode, while supplying an oxygen-containing gas such as oxygen to a cathode. Therefore, for example, a fuel cell vehicle that accommodates the fuel cell carries a gas storage container thereon, which is filled with hydrogen. The fuel cell vehicle runs by using reaction gases made up of atmospheric air, which serves as the oxygen-containing gas, and hydrogen supplied from the gas storage container.

As clearly appreciated from this fact, the larger the hydrogen-accommodating amount of the gas storage container is, the longer the distance that the fuel cell vehicle can successfully run over is. However, if an excessively large gas storage container is carried by the vehicle, the weight of the fuel cell vehicle increases. Consequently, an inconvenience arises in that the load on the fuel cell also is increased. From this viewpoint, various trials have been made in order to improve the hydrogen-accommodating amount, while maintaining a small volume for the gas storage container. As one technique therefor, for example, it has been pointed out that a substance (hereinafter referred to as a "gas absorbing/adsorbing material"), which occludes or adsorbs the gas and which is represented by a hydrogen absorbing alloy, may be accommodated within a container, as described in Japanese Laid-Open Patent Publication No. 2004-108570.

In the case of the gas storage container described in Japanese Laid-Open Patent Publication No. 2004-108570, a powdery hydrogen absorbing alloy is accommodated, as is, inside the container. In general, a reaction whereby the gas absorbing/adsorbing material occludes or adsorbs the gas is an exothermic reaction. Further, when the container is filled with the gas, it is accompanied by adiabatic compression. Therefore, when the gas storage container is filled with hydrogen gas, if the temperature inside the container increases excessively, the occlusion or adsorption of gas by the gas absorbing/adsorbing material is inhibited. Of course, when such a situation arises, the gas accommodating amount also decreases.

In view of the above, it has also been suggested in Japanese Laid-Open Patent Publication No. 2004-108570 that a heat exchanger may be arranged in a substantially central portion of a container, in order to suppress a temperature rise within the container.

On the other hand, it has been suggested in Japanese Laid-Open Patent Publication No. 2001-145832 that a phase changing substance, which induces absorption and release of latent heat depending on a change in temperature, may be enclosed within microcapsules, thereby providing a heat storage material. The heat storage material is accommodated within the container after being mixed with the gas adsorbing material. In this case, it has been affirmed that heat, which is generated when the container is filled with gas, can be absorbed by the heat storage material.

Even if a heat absorbing material or substance is arranged inside the container, as described in Japanese Laid-Open Patent Publication Nos. 2004-108570 and 2001-145832, when gas is introduced into the container, which is filled with a powdery gas absorbing/adsorbing material, from a charging port provided at an upper portion of the container, the gas absorbing/adsorbing material, which is disposed at an upper position, begins to occlude or adsorb the gas. That is, it is impossible to avoid the occurrence of portions therein, which exhibit high temperatures locally within the container. When such a situation arises, portions, which exhibit differing amounts of thermal expansion, arise in the container in some cases. In this case, depending on the situation, there is a concern that an outer shell and a liner, which make up parts of the container, may become exfoliated from each other.

When a heat exchanger is provided, it is inevitable that the heat exchanger must be large in size, in order to avoid the occurrence of such high temperature portions. Due to this fact, the volume and weight of the container must be increased as well.

On the other hand, when a heat storage material is accommodated therein, there is a concern that heat absorption thereby may still be insufficient, due to the high temperature produced locally inside the container. Therefore, in order to reliably absorb heat, a large amount of the heat storage material must be used. However, the heat storage material does not contribute to occlusion and/or adsorption of the gas at all. Therefore, in order to increase the gas-accommodating amount, while utilizing a large amount of the heat storage material, it also is necessary to increase the overall volume and weight of the container.

As described above, an inconvenience arises in that the volume and weight of the container are inevitably increased, in order to avoid high temperatures from occurring during filling of the container with gas.

SUMMARY OF THE INVENTION

A general object of the present invention is to provide a gas storage container, which makes it possible to suppress a temperature rise during filling of the container with a gas, even though the gas storage container is lightweight and small in size.

A principal object of the present invention is to provide a gas storage container, which has a large gas storage density per unit volume or per unit weight.

According to one aspect of the present invention, there is provided a gas storage container including a gas absorbing/adsorbing material and a heat storage material accommodated inside an elongate container, the gas storage container comprising:

a gas distributing tube accommodated in the container, which extends in a longitudinal direction of the container, and which is provided with discharge ports capable of discharging a gas in directions oriented toward an inner side wall of the container, wherein the gas distributing tube is surrounded by the gas absorbing/adsorbing material, and the gas absorbing/adsorbing material is surrounded by a mixture of the heat storage material and the gas absorbing/adsorbing material.

In the above-described arrangement, the elongate gas distributing tube extends in a longitudinal direction of the container. Therefore, the temperature can be raised substantially equivalently in the longitudinal direction of the container. In other words, the occurrence of an uneven temperature in the longitudinal direction can be avoided.

The gas is discharged while being directed toward the inner side wall of the container. Therefore, the gas absorbing/adsorbing material, which surrounds the gas distributing tube, is cooled by the low temperature gas that is discharged from the gas distributing tube during filling of the container with gas. Therefore, the heat storage material need not be arranged in the vicinity of the gas distributing tube, and hence the used amount of heat storage material can be reduced. The used amount of the gas absorbing/adsorbing material can be relatively increased, and therefore, the gas accommodating amount is increased.

Further, heat is absorbed by the heat storage material contained in the mixture, in the vicinity of the inner side wall of the container. Therefore, a rise in temperature is suppressed. Accordingly, absorbing and/or adsorption of the gas by the gas absorbing/adsorbing material contained within the mixture is not inhibited. Consequently, in addition, gas is efficiently occluded and/or adsorbed by the gas absorbing/adsorbing material in the vicinity of the inner side wall of the container. Therefore, the gas accommodating amount can be improved without increasing the volume of the container in order to accommodate a large amount of gas absorbing/adsorbing material. As a result, a gas storage container can be constructed, which is lightweight and small in size, and which exhibits a large gas storage density per unit volume or per unit weight.

In order to balance the gas accommodating amount and suppression of the temperature rise, it is preferable that a distance ranging from the center of the container to a boundary line between the gas absorbing/adsorbing material and the mixture is not less than 30 units, provided that the distance ranging from the center of the container to the inner side wall thereof is assumed to be 100 units. In this case, it is possible to sufficiently occlude and/or adsorb the gas, while also suppressing a rise in temperature.

It is also preferable that a gas absorbing/adsorbing material further be arranged outside of the mixture. With this arrangement as well, a rise in temperature inside the container is suppressed under action of the heat storage material. Therefore, even when a gas absorbing/adsorbing material is arranged only in the vicinity of the inner side wall of the container, occluding (absorbing) and/or adsorption of the gas, which is performed by the gas absorbing/adsorbing material, is not significantly inhibited. Therefore, an increase in the amount of used gas absorbing/adsorbing material is made possible, and accordingly, the gas accommodating amount of the container can be further increased.

In any case, it is preferable that a substance, which undergoes a phase change at 45 to 85° C., is used as the heat storage material, so that a large amount of heat can be absorbed in accordance with such a change in phase. Therefore, the rise in temperature can be suppressed to a remarkable degree.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

A gas storage container according to the present invention shall be explained in detail below with reference to the accompanying drawings, which exemplify preferred embodiments thereof.

Figure 1:
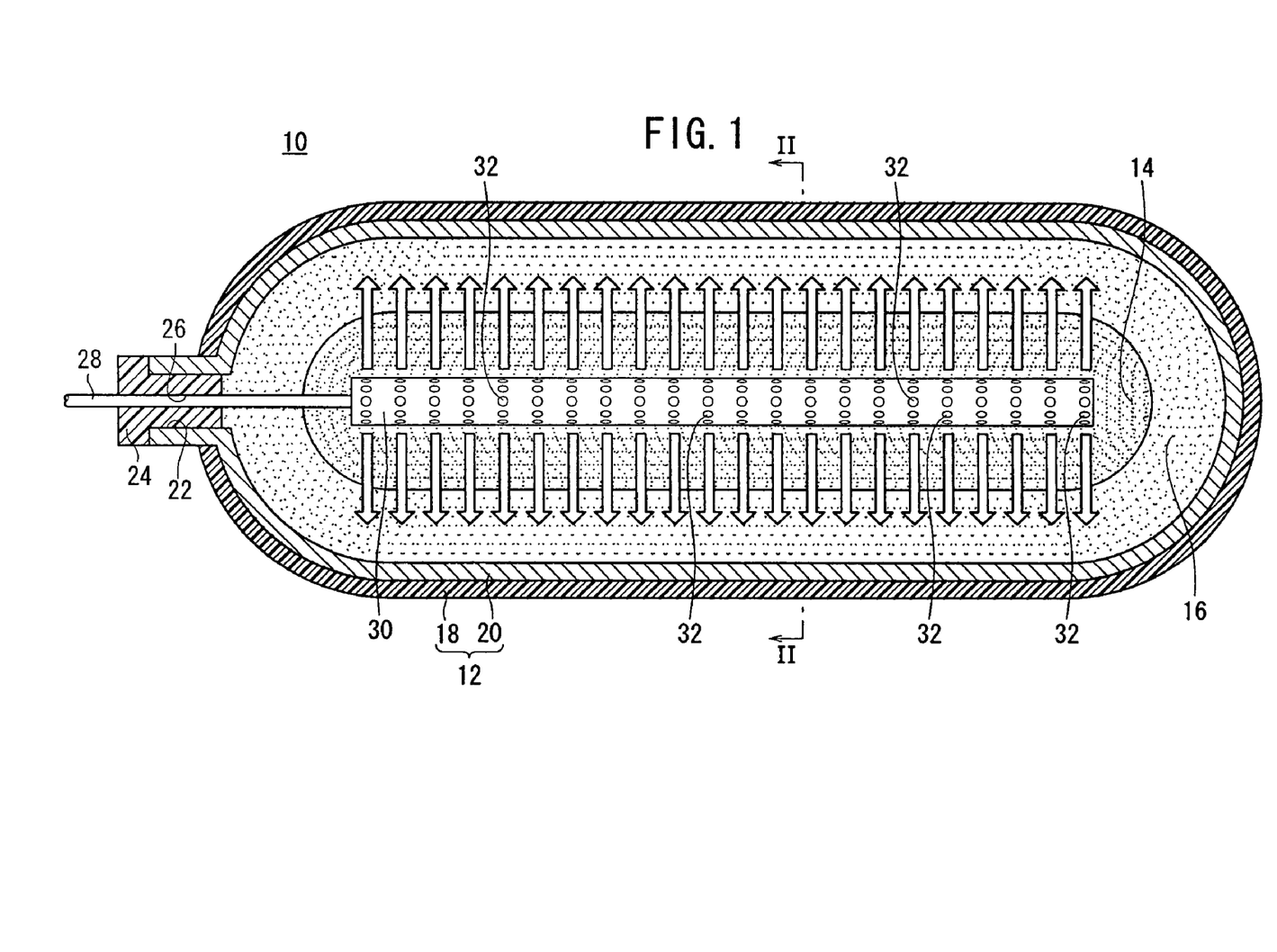
FIG. 1 is a schematic sectional view taken along a longitudinal direction and illustrating a gas storage container in its entirety, according to an embodiment of the present invention.
Figure 2:
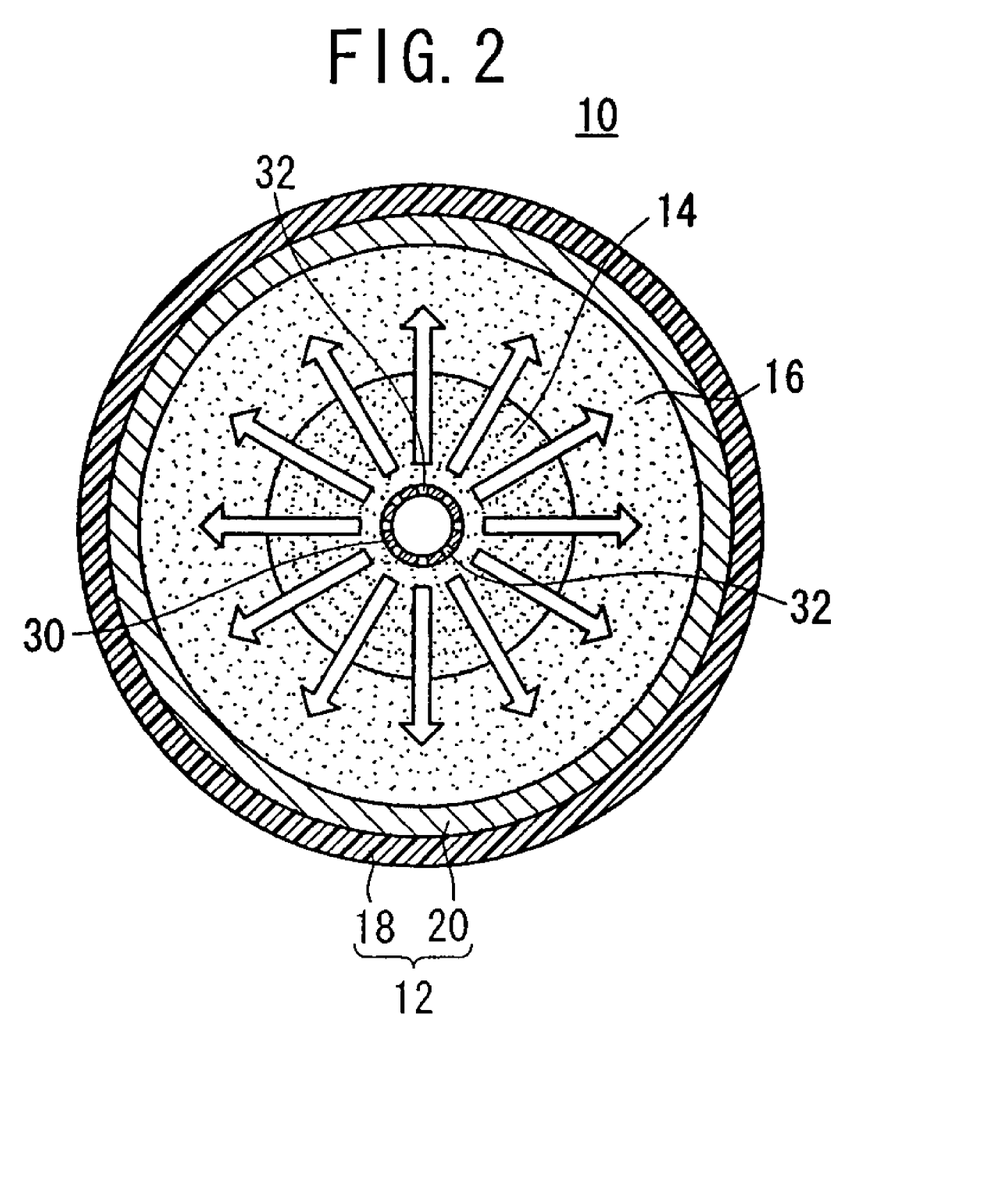
FIG. 2 is a sectional view taken along line II-II indicated by the arrows shown in FIG. 1.

FIG. 1 is a schematic sectional view taken in a longitudinal direction and illustrating a gas storage container 10 in its entirety, according to an embodiment of the present invention. FIG. 2 is a sectional view taken along line II-II, indicated by the arrows shown in FIG. 1. The gas storage container 10 is constructed such that a gas absorbing/adsorbing material 14, and a mixture 16 of the gas absorbing/adsorbing material and a heat storage material, are accommodated respectively in a layered form inside a container 12.

In this arrangement, the container 12 is an elongate member having a substantially perfect circular cross section (see FIG. 2). Both ends thereof have a curved form, in which the diameters thereof are gently reduced (see FIG. 1).

The container 12 has an outer shell 18, and a liner 20 that adheres to the inner wall of the outer shell 18. The outer shell 18 is composed of, for example, a fiber-reinforced resin. On the other hand, the material used for the liner 20 may be a resin material such as polyethylene. However, the material of the liner 20 may also be a metal, such as aluminum or an aluminum alloy. When a metal material having high thermal conductivity is used as the material for the liner 20, heat is quickly transferred from the heat storage material to the outer shell 18. Therefore, an advantage is obtained in that heat, which is generated during filling of the container 12 with gas, is easily removed.

An opening 22 is formed in one end of the container 12, wherein the opening 22 is closed by a closing member 24. One end of a gas supply tube 28 is inserted into a through-hole 26, which is provided at a substantially central portion of the closing member 24. On the other hand, the other end of the gas supply tube 28 is connected to an unillustrated gas supply source.

A gas distributing tube 30, having a hollow cylindrical shape, is connected to a forward end of the gas supply tube 28. As clearly understood from FIG. 1, the gas distributing tube 30 extends substantially over the entire region of the container 12, in the longitudinal direction of the container 12. Further, a diametric center thereof coincides substantially with the diametric center of the container 12 (see FIG. 2). That is, the cross-sectional shapes of the gas distributing tube 30 and the container 12 form concentric circles.

A plurality of discharge ports 32 are formed so as to penetrate through a side circumferential wall of the gas distributing tube 30. Therefore, gas that passes through the gas supply tube 28 and that arrives at the interior of the gas distributing tube 30 is discharged from the discharge ports 32, while being directed toward the inner side wall of the container 12, as indicated by the arrows in FIGS. 1 and 2. The bottom of the gas distributing tube 30 is closed. Therefore, gas is not discharged while the gas is directed toward the bottom inner wall of the container 12.

A gas distributing tube 30, which is constructed as described above, can be manufactured as follows. For example, a metal material such as stainless steel or an aluminum alloy is formed to have a cylindrical shape, and a closing plate is joined to one open end thereof to effect closure by means of a predetermined joining method such as welding. Alternatively, one end of a ceramic hollow sintered member is filled with a plug. The material used for the gas distributing tube 30 may also be a resin material, such as polytetrafluoroethylene.

The gas absorbing/adsorbing material 14 is accommodated within the container 12 such that the gas distributing tube 30 is surrounded thereby from the outer side thereof. In this embodiment, the gas absorbing/adsorbing material 14 is a powder, which is accommodated, for example, inside of an unillustrated flexible and soft container.

The gas absorbing/adsorbing material 14 may be any substance that is capable of occluding and/or adsorbing the gas. For example, the gas absorbing/adsorbing material 14 may be a hydrogen absorbing alloy, or an organic metal complex.

The gas absorbing/adsorbing material 14 is not limited to substances that are capable of occluding and/or adsorbing hydrogen. The gas absorbing/adsorbing material 14 may be a substance that is capable of occluding and/or adsorbing other gases including, for example, carbon dioxide.

The mixture 16 is accommodated within the container 12 such that the gas absorbing/adsorbing material 14 is surrounded thereby, from the outer side thereof. More specifically, in this arrangement, the gas distributing tube 30, the boundary line between the gas absorbing/adsorbing material 14 and the mixture 16, and the inner side wall of the container 12 (liner 20) form concentric circles. It is preferable for the distance ranging from the axial center (center) of the container 12 to the boundary line between the gas absorbing/adsorbing material 14 and the mixture 16, to be not less than 30 units, provided that the distance ranging from the axial center (center) of the container 12 to the side inner wall is assumed to be 100 units, for the following reasons. In particular, as a result of this arrangement, a sufficient gas accommodating amount can be ensured. Furthermore, heat can be sufficiently absorbed during filling of the container 12 with gas.

The heat storage material contained in the mixture 16 may be a sensible heat storage material or a latent heat storage material. Preferred examples of the sensible heat storage material include ceramics such as alumina, mullite, and zirconia, and metals such as aluminum.

On the other hand, a latent heat storage material refers to a substance that absorbs a predetermined amount of heat while undergoing a phase change such as melting or solidification. Preferred examples of such substances include substances that undergo a phase change at a temperature of 45 to 85° C. that is higher than the general temperature used for the gas storage container 10 (environmental temperature: not more than 40° C.). Specifically, such substances are exemplified by hydrates of various inorganic compounds including, for example, sodium chloride hydrate, calcium chloride hydrate, sodium nitrate hydrate, and sodium sulfate hydrate, various straight chain aliphatic hydrocarbons including, for example, tetradecane, pentadecane, octadecane, eicosane, and docosane, paraffin wax, and fatty acid. When the temperature in the container 12 exceeds 100° C., it is appropriate to use a latent heat storage material including, for example, erythritol, sorbitol, and xylitol.

When a latent heat storage material described above is used, it is preferable for the latent heat storage material to be enclosed, for example, in microcapsules, which are mixed with the gas absorbing/adsorbing material 14, for the following reason. Specifically, even when the latent heat storage material undergoes a change in phase by heat absorption, the latent heat storage material does not flow out from the microcapsules. Therefore, permeation of the latent heat storage material into the gas absorbing/adsorbing material 14 disposed inside the container 12 can be avoided.

The ratio between the gas absorbing/adsorbing material and the heat storage material contained in the mixture 16 may be determined in consideration of, for example, the gas occluding and/or adsorbing amount of the gas absorbing/adsorbing material, the potential heat absorbing amount of the heat storage material, and the permissible temperature of the gas storage container 10.

The gas storage container 10 according to the embodiment of the present invention is basically constructed as described above. Next, operations and effects will be explained.

A gas, which is supplied from the gas supply source and arrives at the interior of the gas distributing tube 30 via the gas supply tube 28, is discharged from the discharge ports 32 that penetrate through the side circumferential wall of the gas distributing tube 30. The side circumferential wall of the gas distributing tube 30 faces the inner side wall of the container 12. Therefore, the discharged gas advances in a direction toward the inner side wall of the container 12, as indicated by the arrows shown in FIGS. 1 and 2. During this process, gas is successively occluded and/or adsorbed by the gas absorbing/adsorbing material 14, which surrounds the gas distributing tube 30.

The temperature in the container 12 is raised as a result of heat that is generated by the gas absorbing/adsorbing material 14, in accordance with occluding and/or adsorption of the gas, as well as by adiabatic compression of the gas. The gas distributing tube 30 extends throughout substantially the entire region of the container 12 in the longitudinal direction thereof, as described above. Therefore, the temperature is raised substantially equivalently over the longitudinal direction of the container 12.

In the gas absorbing/adsorbing material 14, temperature rises from the side of the gas distributing tube 30 toward the mixture 16, as the gas advances toward the inner side wall of the container 12. However, the gas absorbing/adsorbing material 14 is positioned in the vicinity of the gas distributing tube 30. Therefore, the gas absorbing/adsorbing material 14 is cooled by the low temperature gas that is discharged from the gas distributing tube 30. Accordingly, the temperature of the gas absorbing/adsorbing material 14 is raised only slightly.

Therefore, the heat storage material need not be arranged in the vicinity of the gas distributing tube 30. That is, according to the embodiment of the present invention, the used amount of heat storage material can be decreased. Therefore, a relatively large amount of the gas absorbing/adsorbing material 14 can be used, and consequently, it is possible to increase the gas accommodating amount.

Figure 3:
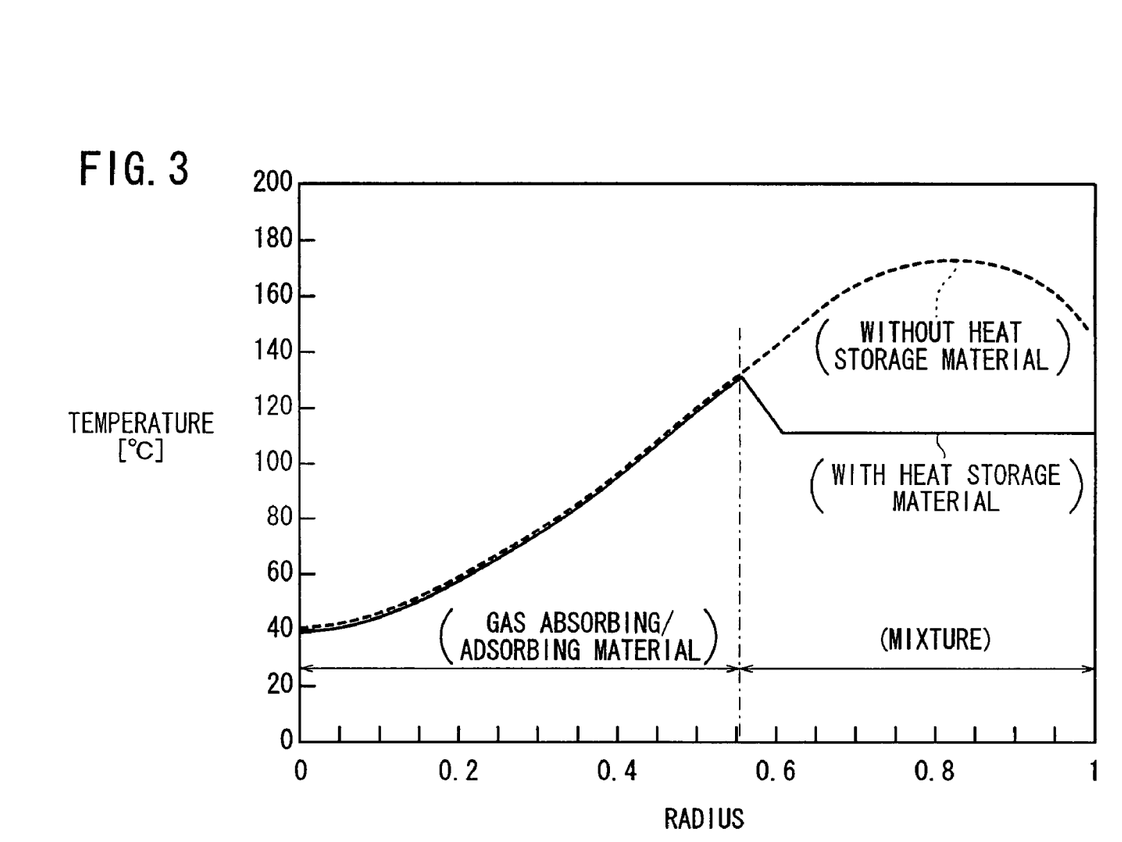
FIG. 3 is a graph illustrating temperature distributions in a radial direction of the gas storage container, in which a gas absorbing/adsorbing material only is accommodated therein, and in which a heat storage material is accommodated in the gas storage container together with the absorbing/adsorbing material.

A cooling effect, which is brought about by the gas being discharged from the gas distributing tube 30, decreases as the distance from the gas distributing tube 30 is increased. Therefore, as shown in FIG. 3, when only the gas absorbing/adsorbing material 14 is accommodated therein, the temperature inside the container 12 rises at positions that are separated farther from the gas distributing tube 30. Occluding and/or adsorption of the gas tends to be inhibited in the gas absorbing/adsorbing material 14 that has a high temperature, as described above.

By contrast, as described above, in the embodiment of the present invention, the mixture 16, which contains the heat storage material therein, is arranged outside of the gas absorbing/adsorbing material 14. Therefore, heat generated in accordance with occlusion and/or adsorption of the gas by the gas absorbing/adsorbing material 14 contained in the mixture 16, as well as heat that is generated by adiabatic compression of the gas, are absorbed by the heat storage material. As a result, as shown in FIG. 3 in combination, an excessive temperature rise within the container 12 is prevented. In FIG. 3, the temperature distribution in the radial direction is shown, assuming that the radius of the container 12 is represented by 1 unit.

This effect is even more remarkable when a latent heat storage material, which undergoes a phase change at 45 to 85° C., is used, for the following reason. Specifically, a large amount of heat is absorbed when the latent heat storage material undergoes a change in phase. Therefore, the rise in temperature can be further suppressed.

As described above, according to the embodiment of the present invention, the temperature rise is suppressed by absorbing heat by means of the heat storage material. Therefore, a decrease in the gas-occluding ability and/or the gas-adsorbing ability of the gas absorbing/adsorbing material contained within the mixture 16 is prevented. In brief, both the gas absorbing/adsorbing material 14, as well as the gas absorbing/adsorbing material contained in the mixture 16, can occlude and/or adsorb a sufficient amount of gas. Therefore, the volume of the container 12 need not be increased in order to increase the accommodating amount of the gas absorbing/adsorbing material 14. Therefore, an increase in the weight of the gas storage container 10 can be avoided. In other words, a gas storage container 10 can be constructed, which has a large gas storage density per unit volume or per unit weight.

Figure 4:
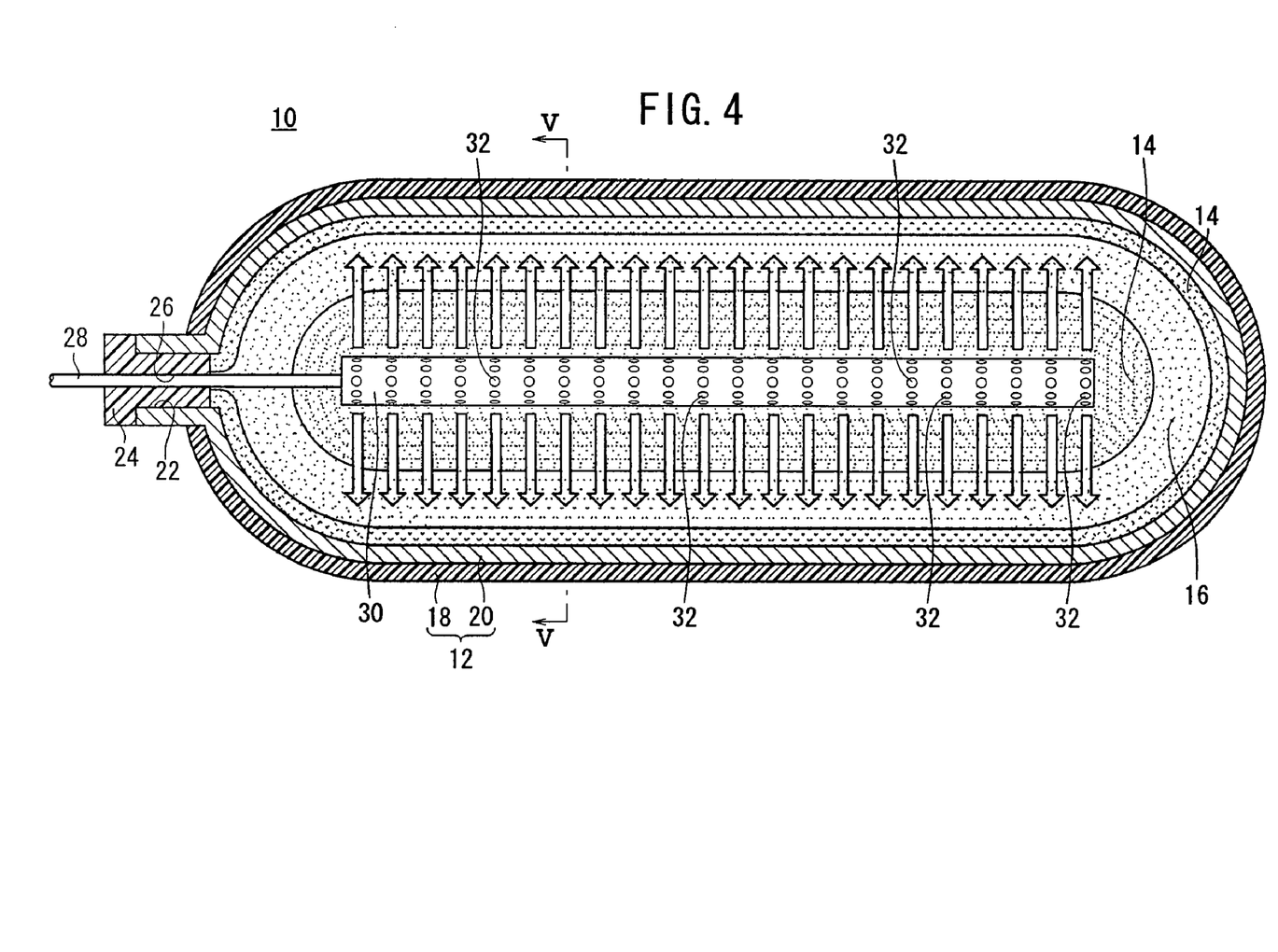
FIG. 4 is a schematic sectional view taken along a longitudinal direction, illustrating a gas storage container in its entirety, according to another embodiment.
Figure 5:
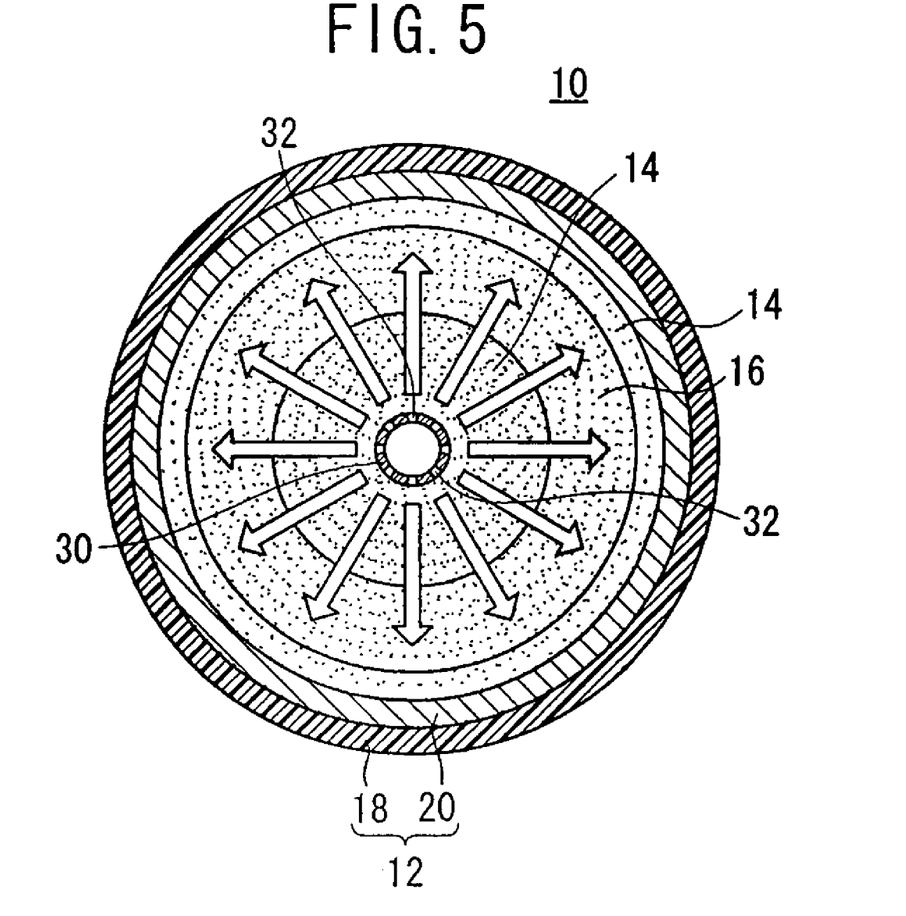
FIG. 5 is a sectional view taken along line V-V indicated by the arrows shown in FIG. 4.

In the embodiment described above, a two-layered structure is provided, which is composed of the gas absorbing/adsorbing material 14 and the mixture 16. However, as shown in FIGS. 4 and 5, a further layer of gas absorbing/adsorbing material 14 may be provided outside of the mixture 16, so as to construct a three-layered structure. Also, in this case, in which the outermost layer is composed of only the gas absorbing/adsorbing material 14, a temperature rise in the container 12 can be sufficiently suppressed by the heat storage material contained within the mixture 16. Therefore, the gas absorbing/adsorbing material 14, which is disposed at the outermost layer, can also sufficiently occlude and/or adsorb gas. Therefore, it is possible to reduce the used amount of the heat storage material, while also increasing the used amount of the gas absorbing/adsorbing material 14. Therefore, the gas accommodating amount can be further increased.

When a three-layered structure is adopted, for example, it is appropriate that the distance from the center of the container 12 to the boundary line between the gas absorbing/adsorbing material 14 disposed inside and the mixture 16 is 30 units, whereas the distance from the center of the container 12 to the boundary line between the mixture 16 and the gas absorbing/adsorbing material 14 disposed outside is 95 units, provided that the distance from the center of the container 12 to the inner side wall is assumed to be 100 units. It goes without saying that there is no special limitation thereto.

The cross-sectional shape of the container 12 is not required to be perfectly circular. The cross-sectional shape of the container 12 may be elliptical or polygonal as well. In any case, it is preferable for the center of the container 12 to be substantially coincident with the center of the gas distributing tube 30, when viewed in cross section perpendicular to the longitudinal direction thereof.

Further, the gas distributing tube 30 is not required to be cylindrical. For example, the gas distributing tube 30 may be shaped as a rectangular parallelepiped.

Especially, the outer shell 18 of the container 12 need not necessarily be provided.

Example 1

A container composed of an aluminum alloy was manufactured, having the shape as shown in FIG. 1, with an inner radius of 164 mm and an internal volume of 8.2 liters. Further, one end of a cylindrical hollow sintered member, made of stainless steel, was enclosed therein to provide a gas distributing tube. The gas distributing tube was connected to a gas supply tube inserted into a through-hole of a closing member. The gas distributing tube was accommodated inside the container by closing an opening of the container with the closing member. Activated carbon, serving as the gas absorbing/adsorbing material, and a mixture of activated carbon and paraffin microcapsules (heat storage material), were also accommodated together inside the container.

Specifically, a cylindrical container having a radius of 66 mm, which was manufactured from a gas permeable elastic film member made of polyurethane and having a thickness of 0.2 mm, was arranged so as to surround the gas distributing tube. 2.56 kg of activated carbon, having an average particle size of 0.5 mm, was accommodated inside the cylindrical container. The activated carbon occupied a region ranging from 0 (center) to 80 units, provided that the inner radius of the container (distance from the center to the inner wall) was assumed to be 100 units.

On the other hand, 1.44 kg of activated carbon and 0.66 kg of the paraffin microcapsules, having an average particle size of 0.1 mm, were mechanically agitated to provide the mixture. The paraffin microcapsules undergo a phase change, i.e., from a solid phase to a liquid phase, at 50° C.

2.1 kg of the mixture was accommodated between the outer side of the cylindrical container and the inner wall of the container so as to construct a gas storage container. A thermocouple for measuring temperature was inserted into the gas storage container.

The interior of the gas storage container, constructed as described above, was filled with a carbon dioxide gas, which was supplied from a carbon dioxide gas supply source via the gas supply tube and the gas distributing tube. The carbon dioxide gas had a reduced pressure of 1 MPa under action of a pressure-reducing valve. This arrangement was designated as Example 1.

On the other hand, a gas storage container was constructed in the same manner as in Example 1, except that the radius of the cylindrical container was 49 mm. Thus, the activated carbon occupied a region ranging from 0 (center) to 60 units, provided that the inner radius of the container was assumed to be 100 units, while the outer portion thereof was surrounded by the mixture. The interior of the container was filled with the carbon dioxide gas. This arrangement was designated as Example 2.

For purposes of comparison, a gas storage container was constructed in the same manner as in Examples 1 and 2, except that only 4 kg of activated carbon was accommodated therein. The interior of the container was filled with carbon dioxide gas. This was designated as a Comparative Example.

Figure 6:
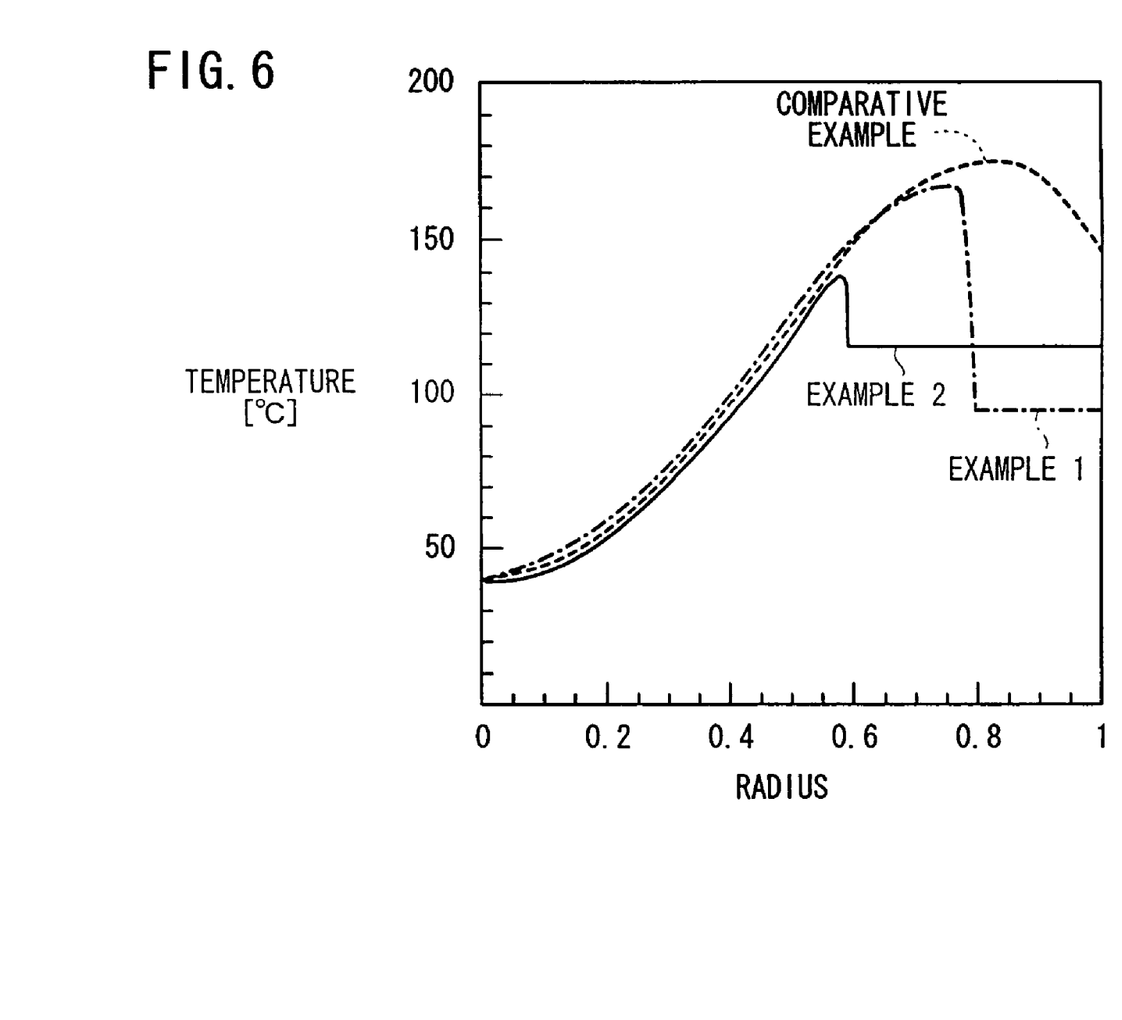
FIG. 6 is a graph illustrating temperature distributions in a radial direction of respective gas storage containers, according to Examples 1 and 2 and a Comparative Example.

FIG. 6 illustrates temperature distributions in a radial direction, provided that the radius of the gas storage container was regarded as 1 unit, in relation to Examples 1 and 2 and the Comparative Example described above. According to FIG. 6, it should be clearly appreciated that in the Comparative Example, in which a heat storage material is not accommodated in the container, a rise in temperature occurs at positions disposed more outwardly in the radial direction. In contradistinction thereto, in Examples 1 and 2, such a rise in temperature is suppressed in a region of not less than 0.8 (Example 1) and in a region of not less than 0.6 (Example 2), in which the heat storage material is present.

Although certain preferred embodiments of the present invention have been shown and described in detail, it should be understood that various changes and modifications may be made therein without departing from the scope of the appended claims.

What is claimed is:

1. A gas storage container including a gas absorbing or adsorbing material and a heat storage material accommodated inside an elongate container, said gas storage container comprising:

a gas distributing tube accommodated in said container, and extending in a longitudinal direction of said container, wherein the gas distributing tube includes discharge ports capable of discharging a gas in directions oriented toward an inner side wall of said container, wherein said gas distributing tube is surrounded by said gas absorbing or adsorbing material, and said gas absorbing or adsorbing material is surrounded by a mixture of said heat storage material and said gas absorbing or adsorbing material.

2. The gas storage container according to claim 1, wherein a distance ranging from a center of said container to a boundary line between said gas absorbing or adsorbing material and said mixture is not less than 30 units, provided that a distance ranging from said center of said container to said inner side wall is assumed to be 100 units.

3. The gas storage container according to claim 1, wherein said mixture is further surrounded by said gas absorbing or adsorbing material.

4. The gas storage container according to claim 1, wherein said heat storage material undergoes a phase change at 45 to 85° C.

5. The gas storage container according to claim 1, wherein said heat storage material is a sensible heat storage material.

6. The gas storage container according to claim 5, wherein said sensible heat storage material is one of alumina, mullite, and zirconia.

7. The gas storage container according to claim 5, wherein said sensible heat storage material is aluminum.

8. The gas storage container according to claim 4, wherein said heat storage material is a latent heat storage material.

9. The gas storage container according to claim 8, wherein said latent heat storage material is one of sodium chloride hydrate, calcium chloride hydrate, sodium nitrate hydrate, and sodium sulfate hydrate.

10. The gas storage container according to claim 8, wherein said latent heat storage material is one of tetradecane, pentadecane, octadecane, eicosane, and docosane.

11. The gas storage container according to claim 8, wherein said latent heat storage material is one of paraffin wax and a fatty acid.

12. The gas storage container according to claim 8, wherein said latent heat storage material is one of erythritol, sorbitol, and xylitol.

13. The gas storage container according to claim 8, wherein said latent heat storage material is enclosed in microcapsules.

14. The gas storage container according to claim 1, wherein said gas absorbing or adsorbing material is activated carbon.

* * * * *